Oct. 21, 1958  J. T. HARRIS  2,857,084
CONSTANT HEAD DEVICE
Filed May 9, 1956
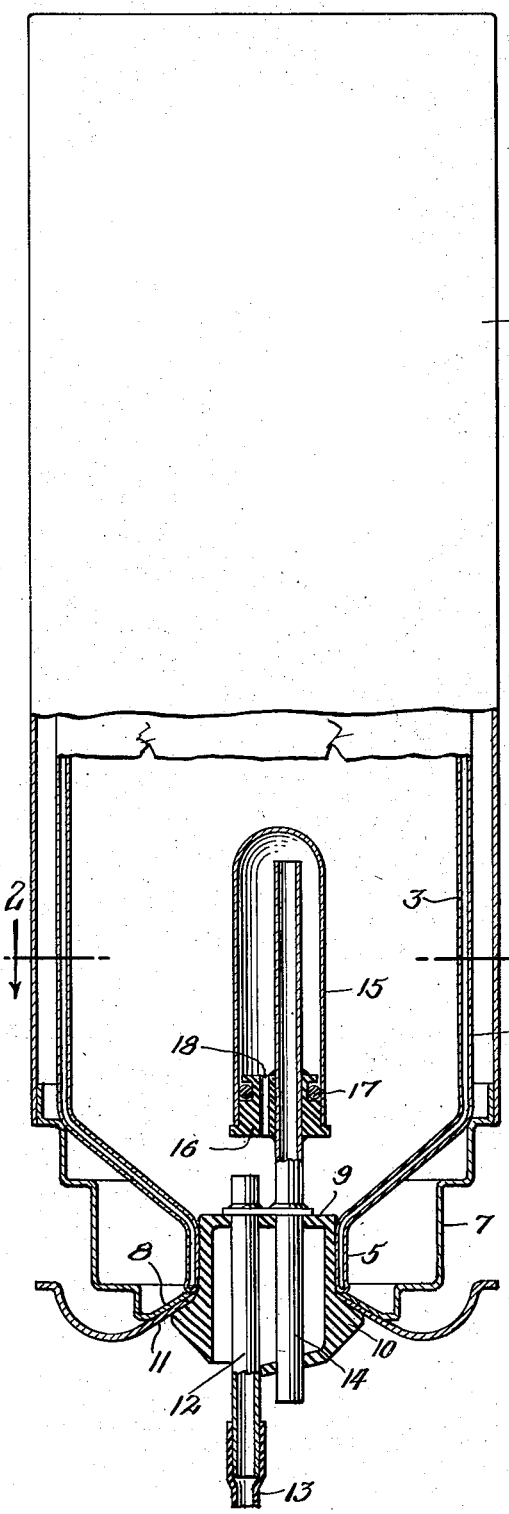
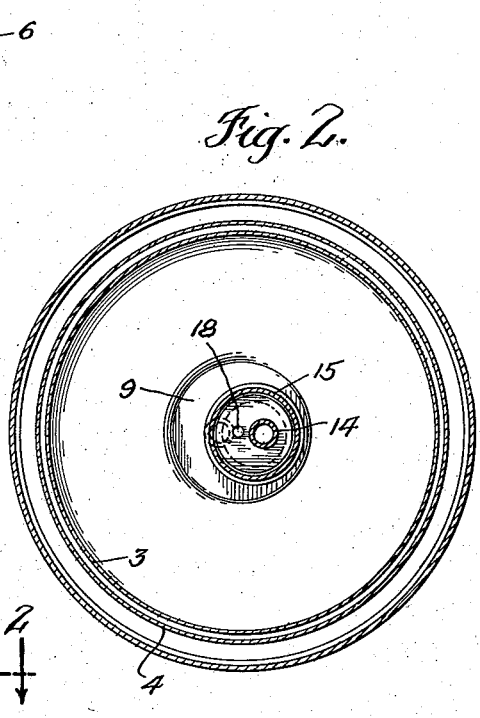
INVENTOR
John T. Harris
BY
Symmestvedt & Lechner
ATTORNEYS United States Patent Office 2,857,084
Patented Oct. 21, 1958

2,857,084

CONSTANT HEAD DEVICE

John T. Harris, Burlington, N. J., assignor to Rudd-Melikian, Inc., Hatboro, Pa., a corporation of Pennsylvania Application May 9, 1956, Serial No. 583,659

4 Claims. (Cl. 222—481)

This invention relates to devices adapted to provide a constant pressure head in reservoirs or containers for liquids.

The invention is especially adaptable to liquid containers in which the liquid level is changeable. The invention is herein illustrated and described as applied to a bottle-type container or reservoir, which is closed except for a neck or other equivalent opening and in which the opening is normally presented downwardly. Bottle-type reservoirs of this kind are used, for instance, to dispense beverages, one example of which is liquid coffee extract as used in certain automatic coffee dispensing machines.

One of the objects of the invention is to provide a device for the establishment of a constant pressure head under which the liquid is downwardly discharged from the bottle, regardless of the liquid level in the bottle.

It is a further object of this invention to provide a device of the kind above referred to which is drip-proof or drip-free.

Still further the invention provides a device of the general kind in question which is readily removable from the bottle and the parts of which are readily separable in the manner to facilitate cleaning thereof, as is required in beverage dispensing apparatus.

With the foregoing objects in mind, attention is directed to the accompanying drawings which illustrate the invention as applied to a beverage dispensing bottle, and in which—

Figure 1 is an elevational view, with the lower portions in vertical section, showing the device of the present invention as applied to the downwardly presented neck portion of a beverage reservoir or bottle; and Figure 2 is a horizontal sectional view taken as indicated by the section line 2—2 on Figure 1.

As shown in the drawings, the bottle here disclosed is of the vacuum-wall type having inner and outer walls 3 and 4, which preferably extend entirely throughout the bottle including the neck portion 5 thereof. Such a bottle is ordinarily completely closed, except for the neck opening which, as here shown, is downwardly presented. An outer or protective casing or cover 6 surrounds the main part of the bottle and a casing part 7 surrounds the neck portion of the bottle, the latter having an inturned lip 8 projecting to substantially abutting relation to the neck 5 of the bottle itself.

A cork or closure, preferably of rubber, is indicated at 9 in position in the neck opening of the bottle. This closure is readily removable and has an enlargement exteriorly of the bottle indicated at 10 between which and the flange 8 the inner lip 11 of a closure removal device projects. This closure removal device in general constitutes a centrally apertured ring member with the inner edge or lip engaged behind the enlargement 10 and with the outer portion projecting sufficiently to facilitate manual engagement thereof for purposes of effecting removal of the closure 9.

A liquid discharge tube 12 projects through and is mounted on the closure 9. The inner or upper end of this tube is in communication with the interior of the bottle in the lower region thereof, to provide for the discharge of liquid from the lower region. The lower end of the tube 12 may be associated with dispensing apparatus and is usually equipped with a valving means which, in the case of a beverage dispenser preferably incorporates metering mechanism. As shown in the drawings, a rubber tube 13 is associated with the lower end of the tube 12. This tube may be used as a part of a valve mechanism, as by providing a controllable clamp for pinching the tube or releasing it.

The closure 9 is penetrated by a second tube 14 the lower end of which is in communication with the atmosphere and the upper end of which projects somewhat above the closure 9 and is surrounded by an elongated tube 15 of diameter considerably larger than that of the tube 14. The upper end of the tube 15 is closed and the lower end is provided with a removable plug 16 between which and the wall of the tube 15 is a sealing ring 17, this ring desirably being made of rubber or other equivalent resilient material. The plug 16 is penetrated by a passage or port 18 providing communication between the interior of tube 15 and the interior of the bottle itself in the lower region thereof.

The tube 15 serves as an air reservoir and for this purpose it has some appreciable volume in relation to the flow passages in the tube 14 and in the port 18. The tube 14 is also extended to a point near the upper end of the air reservoir 15, at which point it has communication with the reservoir, i. e., at a level appreciably above the level of the port 18.

In considering the operation of the arrangement above described, it is here assumed that the bottle is charged, i. e., substantially filled with liquid coffee extract. This may be introduced into the bottle while the bottle is inverted to present the neck opening upwardly, the closure and associated parts being removed at that time. The extract would normally be introduced at a relatively low temperature, for instance at a temperature just a little above the freezing point, so that during a period of use, the temperature would normally gradually rise somewhat. After charging and insertion of the closure 9 with the associated parts, the bottle is inverted and placed in its normal operating position, i. e., in the position illustrated in Figure 1, with the neck opening presented downwardly.

Upon periodic successive discharge of measured quantities of the coffee extract through the tube 12 and the valving mechanism associated with the tube 13, air will enter the tube 14 to maintain the pressure within the reservoir 15 at atmospheric pressure. As each successive quantity of liquid extract is discharged from the bottle, additional air will be introduced into the interior of the bottle from the reservoir 15 through the port 18. It will be noted that this port 18 is located close to the level of the inlet end of the discharge pipe 12, i. e., toward the bottom of the bottle. Because of this arrangement the effective pressure head acting to discharge the liquid through the tube 12 will always remain substantially constant regardless of whether the liquid level in the bottle is adjacent the top of the bottle or close to the level of the air port 18 and the inlet end of the discharge tube 12. With the arrangement as described, the pressure head acting to discharge the liquid through the tube 12 will be maintained at a value corresponding to the vertical height measured from the lower end of the port 18 downwardly to the point of discharge of the liquid through the pipe 12.

It is also pointed out that for the above purposes it is preferred that the port 18 be of relatively small flow area, such as to result in introduction of a series of small air bubbles upon each successive discharge of liquid from the bottle. This is preferred because a port of large flow area tends under varying conditions to introduce such large bubbles as to cause turbulence and thereby disturb the uniformity of pressure head which is desired to be maintained.

In the event of a rise in temperature in the liquid within the bottle, for instance during an interval (such as overnight) during which liquid is not being discharged, some slight expansion of the liquid and/or air may occur within the bottle. This expansion will be accommodated by flow of the liquid upwardly through the port 18, thereby displacing a portion of the air in the reservoir 15. According to the invention, however, the volume of the air reservoir in relation to the volume and coefficient of thermal expansion of the liquid is such that the liquid will never rise in the air reservoir sufficiently to enter the upper end of the air tube 14. In this way it is assured that no dripping of liquid will occur from the air tube 14.

It should further be noted that the arrangement of the tubes 12 and 14 and of the reservoir 15 is such that these parts constitute a unit with the closure 9 for purposes of removal and replacement. This not only facilitates opening and closing of the bottle for purposes of recharging and for the purpose of cleaning the bottle itself, but also facilitates access to the parts carried with the closure 9. Moreover, upon removal of the closure together with the parts carried thereby, the reservoir 15 may readily be removed from the plug 16, and this provides convenient access both to the interior of the reservoir itself as well as to the interior of the air tube 14 for cleaning purposes.

I claim:

1. A device for establishing a substantially constant pressure head in a bottle-type liquid reservoir subject to variations of the liquid level therein, including, in combination with a bottle having a neck opening presented downwardly, a closure for the neck opening having a passage therethrough for a liquid discharge connection from the lower region of the bottle to the exterior thereof, said closure having a second passage therethrough for an air flow connection between the atmosphere exteriorly of the bottle and the interior of the bottle, an air flow connection tube extending upwardly in the bottle from said second passage, and an air reservoir within the bottle surrounding said tube with its upper portion in communication with the tube, the air reservoir having a port providing intercommunication between the interior of the air reservoir and the lower region of the interior of the bottle.

2. A construction according to claim 1 in which the said port is of small cross-sectional flow area as compared with the flow area of the said tube between the air reservoir and the atmosphere.

3. A device for establishing a substantially constant pressure head in a bottle-type liquid reservoir subject to variations of the liquid level therein, including, in combination with a bottle having a neck opening presented downwardly, a removable closure for the neck opening, a liquid discharge tube extended through and mounted on the closure and providing for discharge of liquid from the lower region of the interior of the bottle, an air tube extended through and mounted on the closure with its outer end communicating with the atmosphere, and an air reservoir within the bottle and with which the air tube communicates the air reservoir having a port communicating with the lower region of the interior of the bottle, said air tube, air reservoir and port providing a continuous passage through which air may flow into the bottle to replace liquid discharged therefrom, the bottle closure, tubes and reservoir being unitarily removable from and through the neck opening of the bottle, the neck closure having an enlargement toward its outer end, and the construction further including a device for facilitating removal of the closure comprising a centrally apertured ring member having its inner edge disposed behind said enlargement.

4. A construction according to claim 3 having means for separably connecting the air reservoir to the air tube.

References Cited in the file of this patent

FOREIGN PATENTS 138,680     Germany _____ Feb. 19, 1903